(12) United States Patent
Reumerman et al.

(10) Patent No.: US 11,071,093 B2
(45) Date of Patent: Jul. 20, 2021

(54) LINK ADAPTION BY CHANNEL BUNDLING IN A WIRELESS COMMUNICATION SYSTEM

(71) Applicant: KONINKLIJKE PHILIPS N.V., Eindhoven (NL)

(72) Inventors: Hans-Jurgen Reumerman, Eindhoven (NL); Georgios Orfanos, The Hague (NL); Bernhard Walke, Wuerselen (DE); Jelena Mirkovic, Aachen (DE); Theodorus Jacobus Johannes Denteneer, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 16/395,450

(22) Filed: Apr. 26, 2019

(65) Prior Publication Data

US 2019/0274120 A1    Sep. 5, 2019

Related U.S. Application Data

(63) Continuation of application No. 12/668,469, filed as application No. PCT/IB2008/052798 on Jul. 11, 2008, now abandoned.

(30) Foreign Application Priority Data

Jul. 19, 2007    (EP) .................................... 07301251

(51) Int. Cl.
*H04W 72/02* (2009.01)
*H04L 1/00* (2006.01)
*H04W 72/08* (2009.01)

(52) U.S. Cl.
CPC ........... *H04W 72/02* (2013.01); *H04L 1/0001* (2013.01); *H04W 72/082* (2013.01)

(58) Field of Classification Search
CPC .................................................. H04W 72/082
See application file for complete search history.

(56) References Cited

U.S. PATENT DOCUMENTS

| | | |
|---|---|---|
| 6,456,844 B1 | 9/2002 | Parantainen |
| 7,340,009 B2 | 3/2008 | Giannakis |

(Continued)

FOREIGN PATENT DOCUMENTS

| | | |
|---|---|---|
| EP | 1633069 A1 | 3/2006 |
| JP | H04227136 A | 8/1992 |

(Continued)

OTHER PUBLICATIONS

Orfanos, G. et al., "MC-CDMA based IEEE 802.11 Wireless LAN," Proceedings IEEE MASCOTS 2004, Oct. 2004.

(Continued)

*Primary Examiner* — Wen W Huang

(57) ABSTRACT

A method of reducing interference in a communication system supporting multiple radio channel communication scheme, where a communication link can be established between a transmitter and a receiver. The transmitter first determines interference level at the transmitter, and then based on the determined interference level, performs link adaptation. The link adaptation comprises applying channel bundling for adapting the communication link so as to transmit simultaneously on at least two radio channels from the transmitter to the receiver.

20 Claims, 4 Drawing Sheets

(56) References Cited

U.S. PATENT DOCUMENTS

| | | |
|---|---|---|
| 7,373,162 B2 | 5/2008 | Farnham |
| 7,522,552 B2 | 4/2009 | Fein |
| 7,545,791 B2 | 6/2009 | Malik |
| 7,680,459 B2 | 3/2010 | Faltman |
| 2001/0005378 A1 | 6/2001 | Lee |
| 2005/0122299 A1 | 6/2005 | Scherzer |
| 2005/0136921 A1 | 6/2005 | Stephens |
| 2005/0201361 A1* | 9/2005 | Morioka ............ H04W 74/085 370/352 |
| 2006/0068715 A1 | 3/2006 | Hundal |
| 2006/0114823 A1 | 6/2006 | Flemming |
| 2006/0189352 A1* | 8/2006 | Nagai .................. H04W 28/16 455/561 |
| 2007/0077736 A1 | 4/2007 | Yamaguchi |
| 2007/0147485 A1* | 6/2007 | Sakamoto ............ H04L 1/0026 375/219 |
| 2007/0266157 A1* | 11/2007 | Xhafa ............... H04W 74/0808 709/225 |
| 2008/0009243 A1 | 1/2008 | Hart |

FOREIGN PATENT DOCUMENTS

| | | |
|---|---|---|
| JP | 2007089141 A | 4/2007 |
| WO | WO9849785 A1 | 11/1998 |
| WO | WO2005117464 A2 | 12/2005 |
| WO | WO2006020568 A1 | 2/2006 |
| WO | WO2006109213 A1 | 10/2006 |

OTHER PUBLICATIONS

Tang, F. et al., "Adaptive Link Adaptation", Global Telecommunications Conference, 2001. GLOBECOM '01. IEEE vol. 2, Nov. 25-29, 2001, pp. 1262-1266.

Orfanos, G. et al., "A New Distributed Coordination Function for W-LANs with Multiple Channel Structure", Proceedings of 11th European Wireless Conference 2005, Band 1, Dresden, Germany, Jun. 2005.

Yi, C. S. et al., "Adaptive Minimum Bit Error Rate Multi-User Detection for Asynchronous MC-CDMA Systems in Frequency Selective Rayleigh Fading Channels," in IEEE Proceedings, PIMRC 2003, Sep. 7-10, 2003, vol. 2.

Kim et al : "Link Adaptation Strategy on Transmission Rate and Power Control in IEEE 802.11 WLANs"; Vehicular Technology Conference 2006M Sep. 2006, pp. 1-5.

Siebert et al: "Enhanced Link Adaptation Performance Applying Adaptive Sub-carrier Modulation in OFDM Systems"; 57th IEEE Semi-annual Vehicular Technology Conference Proceedings, Jeju Korea, Apr. 22-25, 2003, vol. 2, pp. 920-924.

Qiao, et al: "Goodput Analysis and Link Adaptation for IEEE 802.11a Wireless LANs"; IEEE Transactions on Mobile Computing, vol. 1, No. 4, pp. 278-292, Oct. 2002.

* cited by examiner

US 11,071,093 B2

LINK ADAPTION BY CHANNEL BUNDLING IN A WIRELESS COMMUNICATION SYSTEM

The present invention relates to a method of reducing interference in a communication system. More specifically the invention relates to a new link adaptation scheme applicable in various communication systems. The invention also relates to a corresponding computer program product and communication device.

In wireless communication networks, the conditions of the wireless channel change continuously. In many cases the changes are so remarkable that a reaction from the communication network is required in order to continue fulfilling the transmission requirements. One possible reaction is link adaptation. Link adaptation is a technique applied in networks, where different Physical layer (PHY) modes are available for data transmission, and conventionally it consists of a function that chooses the appropriate PHY mode, under the given channel conditions. Physical layers provide multiple data transmission rates by employing different modulation and channel coding schemes.

In modern wireless local area network (LAN) and personal area network (PAN) standards, a variety of PHY modes, consisting of a modulation and coding scheme, are available for the data transfer. Current link adaptation schemes choose one of the available PHY modes for the oncoming data transfer, based on some decision variables such as the packet error rate (PER) and/or measurements on channel quality, performed by the mobile stations (MSs) during idle times.

Publication entitled "Goodput Analysis and Link Adaptation for IEEE 802.11a wireless LANs" by Daji Qiao et al., IEEE transactions, vol. 1, issue 4, October-December 2002, pages 278-292 discloses an example of a link adaptation algorithm. This and similar algorithms perform well for IEEE 802.11a/e wireless LANS (WLANs), but they are designed for a single channel protocol, and are suboptimal when used in multichannel systems. Especially when multiple access interference (MAI) among different, simultaneous transmissions of different users is present, the adjustment of the PHY mode used by one of the active users on one channel, and consequently the transmission power used, changes the interference situation in the network. This results in affecting other links that need to adjust their transmission characteristics. As a consequence, the network might become instable. Thus, there is a need for an improved link adaptation algorithm that performs well in multichannel systems.

According to a first aspect of the invention there is proposed a method of reducing interference as recited in claim 1.

Especially in asynchronous code division multiple access (CDMA) networks, the performance of the receiver is highly affected by the number of simultaneous users, the relative delay between their transmissions and the power of each interferer. By applying channel bundling, the transmitter occupies at least two channels, and reduces the number of potential interferers to its receiver by one in case two channels are used. By occupying multiple channels, the transmitter blocks these channels so that other users cannot use these channels while the transmitter is occupying these channels. Thus, the performance of a multi user detector (MUD) is enhanced, leading to higher interference suppression and higher signal to interference and noise ratio (SINR) at the interference detector. In some cases, this SINR enhancement is enough to keep the PHY mode unchanged and profit from lower delays.

Furthermore, channel bundling offers more capacity to the link and in case a lower PHY mode is used, this method can consequently compensate for the longer transmission time required.

According to a second aspect of the invention there is provided a computer program product comprising instructions for implementing the method according the first aspect of the invention when loaded and run on computer means of the transmitter.

According to a third aspect of the invention there is provided a communication device as recited in claim 10, the device being arranged for implementing the method according to the first aspect of the present invention.

Other features and advantages of the invention will become apparent from the following description of non-limiting exemplary embodiments, with reference to the appended drawings, in which.

In the following description some non-limiting exemplary embodiments of the invention will be described in more detail in the context of coded distributed coordination function (C-DCF) in a multi carrier CDMA (MC-CDMA) system. However, it is to be understood that the invention is not restricted to this environment, but the teachings of the invention are equally applicable in communication systems employing other multiple access schemes such as frequency division multiple access (FDMA), as far as they employ multiple channel structure.

An example of a communication system that operates in accordance with the MC-CDMA scheme is IEEE 802.11a/e which has become a worldwide WLAN standard. From the point of view of medium access control (MAC) layer, by the use of MC-CDMA, the frequency channel is divided in several channels separated by different spreading sequences. The different channels can also be referred to as codechannels (cchs). The DCF, as the basic access mechanism of the IEEE 802.11 MAC, achieves automatic medium sharing between compatible devices through the use of carrier-sense multiple access with collision avoidance (CSMA/CA). Before the device starts transmission, it senses the wireless medium to determine if it is idle. If the medium appears to be idle, the transmission may proceed, otherwise the device will wait until the end of in-progress transmission. The CSMA/CA mechanism requires a minimum specified space between contiguous frame transmissions. A device will ensure that the medium has been idle for the specified inter-frame interval before attempting to transmit.

The distributed inter-frame space (DIFS) is used by devices operating under the DCF to transmit data frames. A device using the DCF has to follow two medium access rules: (1) the device will be allowed to transmit only if its carrier-sense mechanism determines that the medium has been idle for at least DIFS time; and (2) in order to reduce the collision probability among multiple devices accessing the medium, the station will select a random backoff interval after deferral, or prior to attempting to transmit another frame after a successful transmission. The device which has a data packet to transmit, draws a random number between 0 and contention window, which determines the duration of the backoff timer in number of timeslots.

Figure 1:
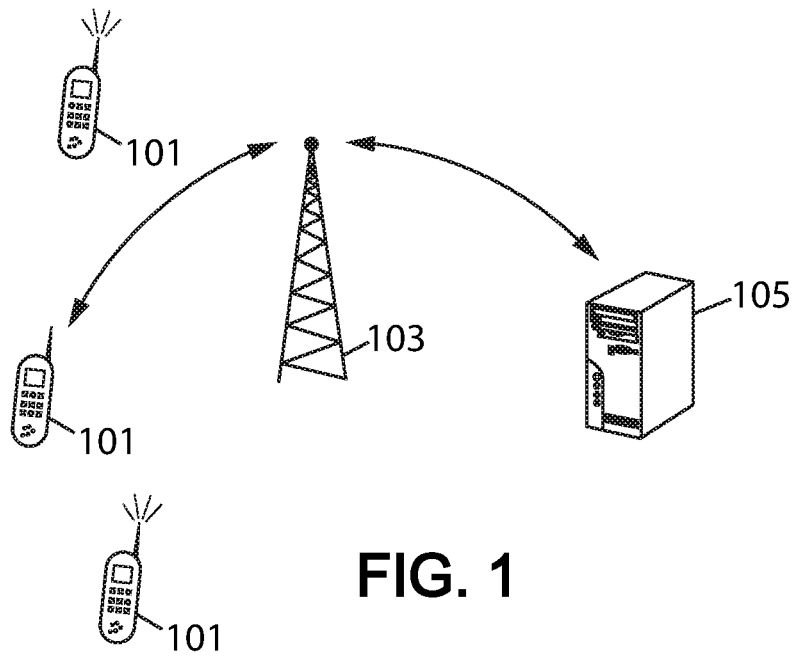
FIG. 1 is a block diagram of the environment, wherein the teachings of the invention may be applied.

FIG. 1 shows an environment, where the teachings of the present invention can be applied. In FIG. 1 there are shown wireless communication devices 101, in this example mobile phone handsets 101. In this example these devices 101 are arranged to communicate in accordance with the IEEE 802.11a standard with an access point 103. Thus, the communication between the wireless devices takes place over the air. The access point 103 may further relay the requests sent by the devices 101 to a server 105. A wired connection can be arranged between the access point 103 and the server 105. In the arrangement of FIG. 1 only one wireless device is entitled to communicate at a time on a certain channel with the access point 103. For this purpose, the wireless devices take advantage of the CSMA/CA as explained above. However, the wireless devices 101 may simultaneously communicate with the same access point by using other channels or with other access points using the same communication channel and the same or different communication protocol thereby causing interference in the communication system.

Figure 2:
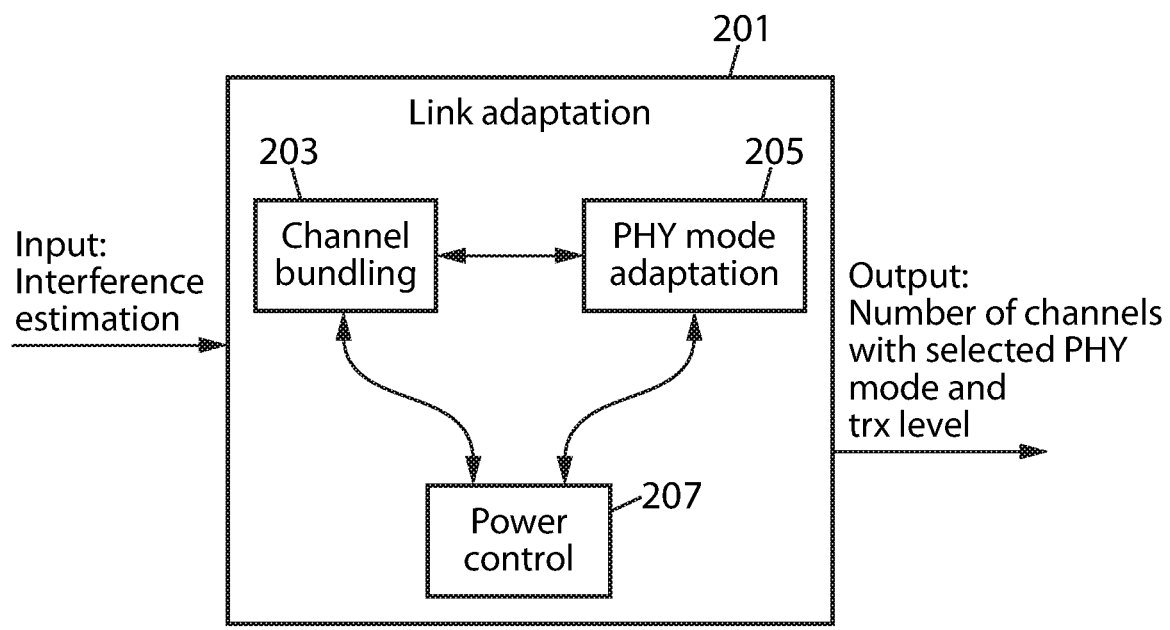
FIG. 2 is a block diagram of the adaptation block capable of applying channel bundling in accordance with the present invention.

FIG. 2 shows a simplified block diagram of the link adaptation block 201 that is part of the communication device 101. Other elements of the communication device 101 are not described in this context, since they are known for a skilled man in the art. The link adaptation block 201 comprises three blocks in FIG. 2, namely a channel bundling block 203, a PHY mode adaptation block 205 and a power control block 207. As can be seen from the figure, these blocks are arranged to communicate with each other so that when one of these blocks is making a decision, the operation of the other blocks can be taken into account in the decision making. The link adaptation block 201 takes as an input determined interference level and outputs the number of transmission channels, with selected PHY mode and transmission power level. According to an embodiment, the determined interference level is input to all of these three blocks. The operation of these blocks is later described in more detail.

Figure 3:
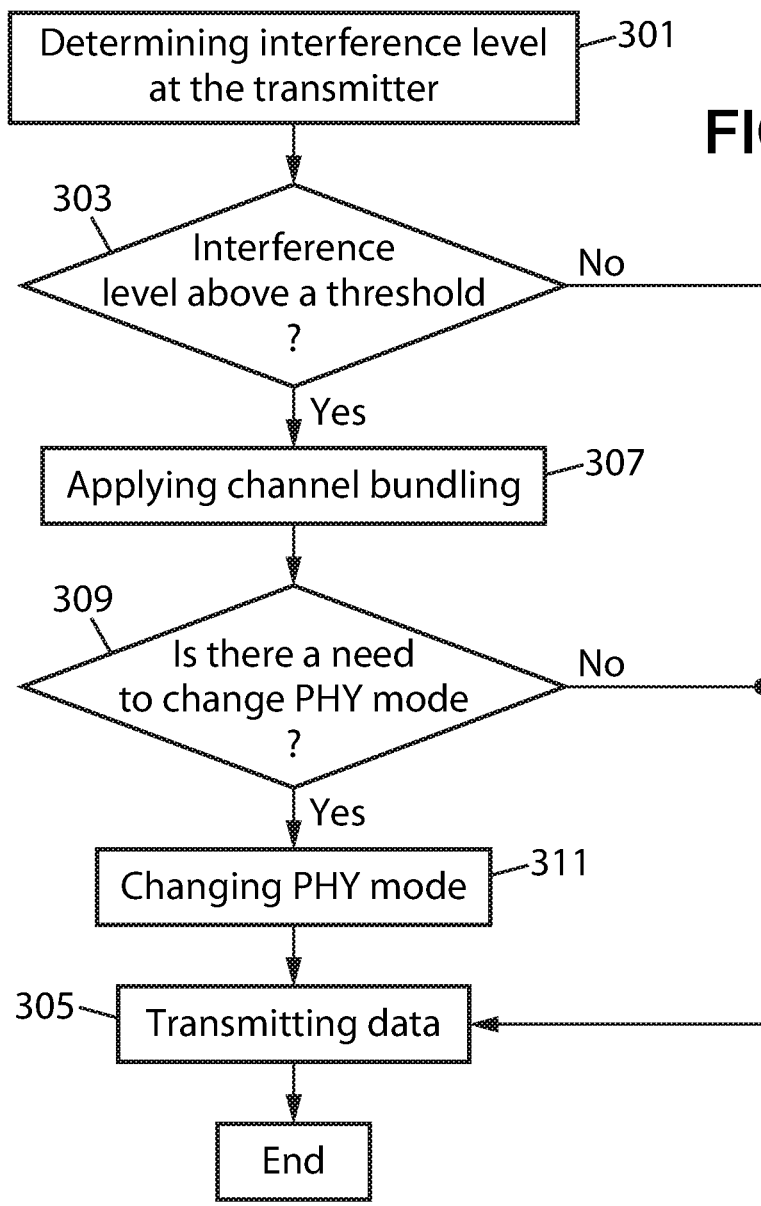
FIG. 3 is a simplified flow chart in accordance with an embodiment of the present invention.

FIG. 3 shows a flow chart depicting the method of reducing interference in a communication system in accordance with an embodiment of the invention. The method depicted in the flow chart of FIG. 1 can be applied in a wireless device 101, which intends to transmit data to the access point 103.

In step 301 the wireless device 101 determines the interference level on the radio channel it intends to use for transmission. For determining the interference, it may for instance measure signal to interference ratio (SIR) of a pilot signal received from the access point 103 or PER or any other relevant value. The determined interference level is then fed to the link adaptation block 201. Then in step 303, the interference level is compared to a pre-defined threshold value. The comparison can be done in each of the blocks contained in the link adaptation block 201. Alternatively there could be one element for the comparison so that this element would then inform the other blocks in the link adaptation block 201. The threshold value could also be adjusted dynamically depending on some variables in the network. For instance when transmitting data more interference is tolerated than when transmitting speech. Thus, the interference threshold may depend on the type of transmission. If the interference level is below the threshold, then there is no need for link adaptation and the transmission can take place in step 305 once there are free resources using the intended modulation and coding scheme.

Figure 4:
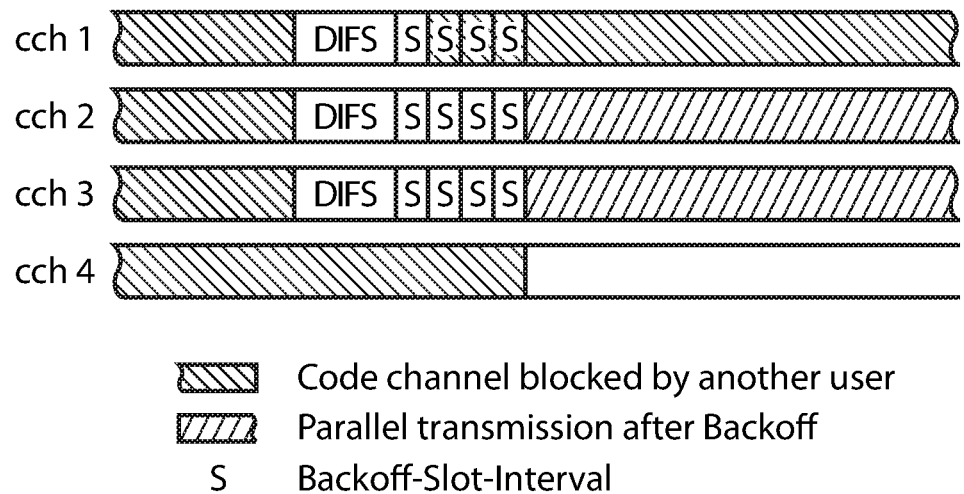
FIG. 4 shows four transmission channels along a timeline, where two channels are bundled for simultaneous transmission.

However, if in step 303 it is determined that the interference level is not below the threshold value, then channel bundling is applied in step 307 by the channel bundling block 203. The principle of channel bundling is shown in FIG. 4. In this case the data is transmitted simultaneously on channels 2 and 3 as shown in the figure. Channel 1 is not suitable for transmission, since during the backoff period it was detected that there was another terminal already transmitting on this channel. On the other hand channels 2 and 3 are free because during the backoff period, which in this example is four timeslot periods, these channels were determined to be free. In this example channel 4 is not suitable for transmission during the desired period as it was occupied. Even if in the example of FIG. 4, the transmission on channel 4 ends roughly at the same time as the transmissions on channels 2 and 3 start, this does not have to be the case. The only thing that matters in this case is that the channel 4 was occupied during the DIFS and backoff periods. As the invention is explained in the context of MC-CDMA system, in FIG. 4 different coded channels are identified by their respective spreading codes. Of course the wireless device 101 could transmit on more than two channels simultaneously if need be with the condition that there are enough free channels available.

Figure 5:
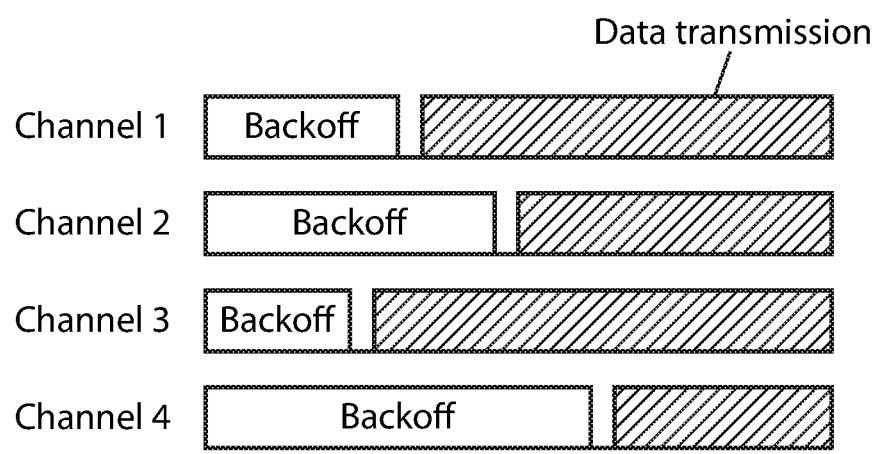
FIG. 5 shows four transmission channels on which data transmission starts at different time instants.

Once the decision is made to apply channel bundling, then multiple backoff processes are started in parallel. The backoff processes do not necessarily have to have the same backoff parameters. Usually, even if the backoff parameters are the same on all channels, depending on the traffic on the channels, some backoff count-downs will end earlier than others. The device 101 may then start multiple transmissions in parallel on the different channels, on which the back-off has been completed. There are two alternatives:

The device 101 starts transmission on each channel independently, once a backoff has been completed. In this case the transmissions on different channels do not usually start at the same time. This is shown in FIG. 5.

Figure 6:
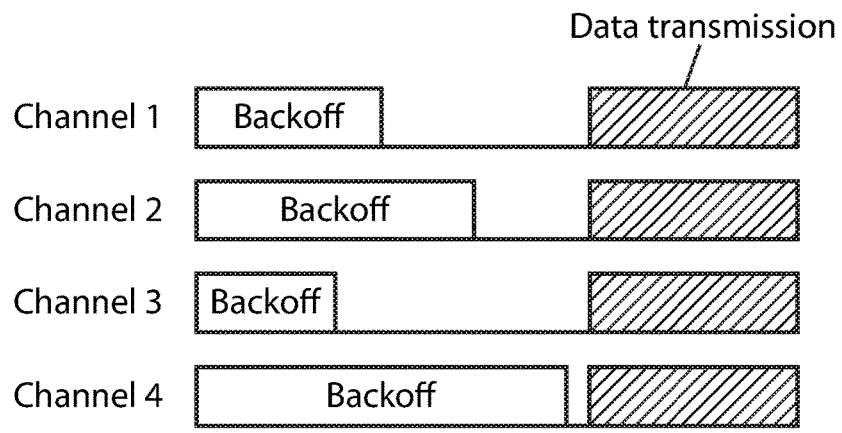
FIG. 6 shows four transmission channels on which data transmission starts simultaneously.

The device 101 starts transmission on multiple channels in parallel, but waits until the backoff on a certain number of (up to all) channels has been completed to transmit the data in parallel, e.g. at a higher "bundle data rate". This is shown in FIG. 6.

This procedure can be expanded for stations using n out of m (n≤m) channels, where the countdown is not interrupted in p (p≤n) cases, leading the station to start parallel transmissions on d (d≤p) channels. It is to be noted that in FIGS. 5 and 6, the backoff periods are different for different channels, whereas in FIG. 4 a common backoff period is chosen for several channels.

Then in step 309 it is determined whether there is need to change the PHY mode, i.e. the modulation and/or coding scheme. If there is no need to change the PHY mode, then the data can be transmitted on the selected channels. On the other hand, if in step 309 it is determined that PHY needs to be changed, then in step 311, the wireless device 101 that intends to transmit the data changes the PHY as decided in step 309. This is done by the PHY mode adaptation block 205. Thus, if both the channel bundling adjustment and the change of PHY mode are done, the method can be referred to as a two dimensional link adaptation method. Then the data is transmitted in step 305. Also, if in step 309 it was determined that there is no need to change the PHY, then data is transmitted in step 305 without changing the PHY mode. After this the procedure comes to an end or it may restart again by determining the interference level in step 301.

The IEEE 802.11a has eight PHY modes as shown in Table 1. For instance for a link that operates by using a PHY mode 3, i.e. QPSK modulation with code rate ½ can be switched to operate on two parallel channels in mode 1 with BPSK modulation and code rate ½. In both cases the final data rate is 12 Mbps. Thus, by using the method of the present invention the data rate can be kept constant, if this is wanted. It is of course also possible to transmit simultaneously on multiple channels with increased PHY mode. This would mean that the transmission would be completed in a much shorter time.

TABLE 1

Eight PHY modes of the IEEE 802.11a.

| Mode | Modulation | Code rate | Data rate |
|------|------------|-----------|-----------|
| 1 | BPSK | ½ | 6 Mbps |
| 2 | BPSK | ¾ | 9 Mbps |
| 3 | QPSK | ½ | 12 Mbps |
| 4 | QPSK | ¾ | 18 Mbps |
| 5 | 16-QAM | ½ | 24 Mbps |
| 6 | 16-QAM | ¾ | 36 Mbps |
| 7 | 64-QAM | ⅔ | 48 Mbps |
| 8 | 64-QAM | ¾ | 54 Mbps |

Figure 7:
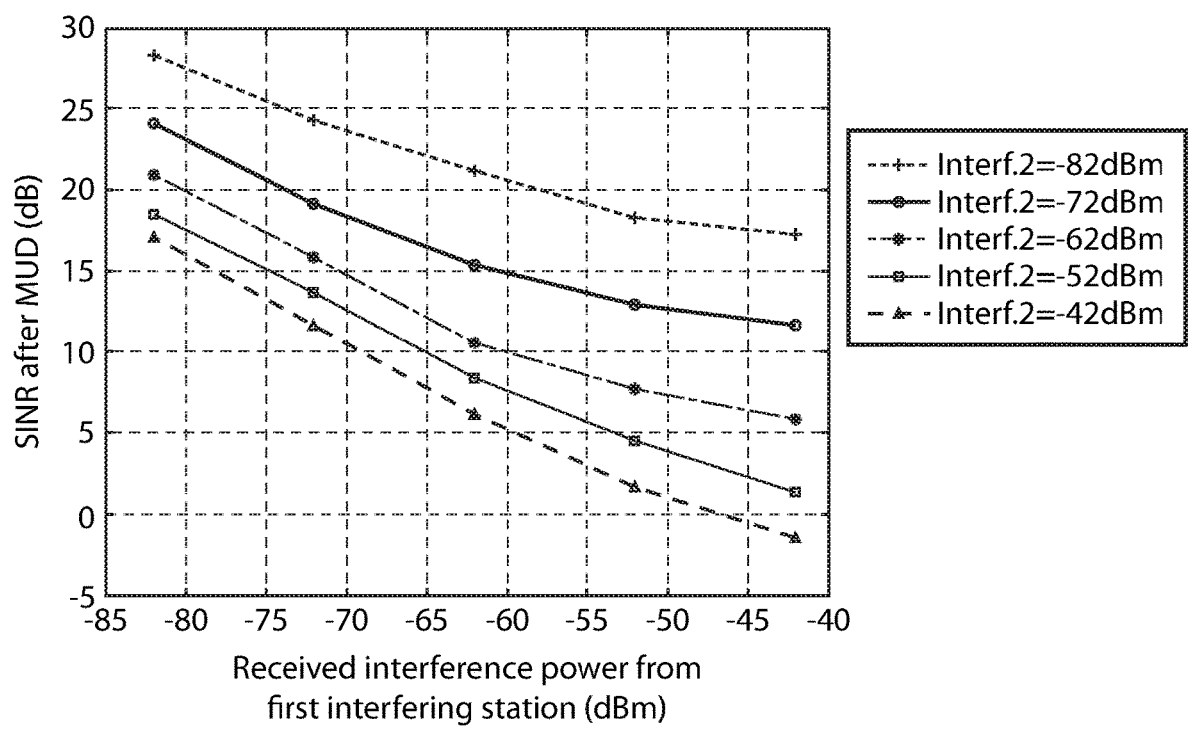
FIG. 7 is diagram showing simulation results.

FIG. 7 shows some simulation results. SINR at the detector, i.e. at the device 101, is shown as a function of the power of the first interferer for five different values of the second interferer's power. The SINR value in the diagram is the average over 10 000 runs with different relative delays among concurrent user transmissions. The graphs show that performance decreases almost linearly as a function of the interfering power. One important observation is that the MUD manages to provide a positive SINR even in the case when all the three interfering signals are 5 dB higher than the carrier strength. This demonstrates the interference suppression ability of the detector in the presence of high multiple access interference (MAI). The interference reduction by channel bundling affects positively all other links in the network, having as a minimum consequence the reduction of the applied transmission powers. The outcome is overall interference reduction and power saving at many devices 101.

In cases when a connection cannot be driven with the chosen PHY mode, it is beneficial according to the two dimensional link adaptation scheme to use channel bundling by the transmitting device before shifting to a more robust PHY mode.

The channel bundling can also be applied by a link adaptation algorithm as an alternative to power adjustment, for instance by a power control algorithm. Thus, when receiving from the network a power control command to lower the transmission power, the device 101 would perform channel bundling possible simultaneously lowering the PHY mode, but without adjusting the transmission power. In this case the power control block 207 would control the channel bundling and PHY mode adaptation blocks. Alternatively, the channel bundling can be applied by a link adaptation algorithm in conjunction with power adjustment, for example by a power control algorithm.

The invention equally relates to a computer program product that is able to implement any of the method steps of the embodiments of the invention when loaded and run on computer means of the transmitting device 101.

The invention equally relates to an integrated circuit that is arranged to perform any of the method steps in accordance with the embodiments of the invention.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used.

A computer program may be stored/distributed on a suitable medium supplied together with or as a part of other hardware, but may also be distributed in other forms, such as via the Internet or other wired or wireless telecommunication systems. Any reference signs in the claims should not be construed as limiting the scope of the invention.

The invention claimed is:

1. A method of reducing interference in a Carrier Sense Multiple Access with Collision Avoidance (CSMA/CA) communication system wherein a communication link is established between a transmitter and a receiver by monitoring a channel for transmissions for a collision avoidance duration and only transmitting after a channel has been idle for the collision avoidance duration, the method comprising:
   determining an interference level at the transmitter for a transmission from the transmitter to the receiver;
   comparing the determined interference level to a threshold value, wherein the threshold value is adjusted dynamically based on a type of the transmission; and
   when the determined interference level does not exceed the threshold value, transmitting from the transmitter to the receiver on a channel that has been idle for a collision avoidance duration, and
   when the determined interference level exceeds the threshold value, performing a link adaptation,
   wherein performing the link adaptation comprises:
      identifying at least two channels that are idle for the collision avoidance duration,
      applying a channel bundling by transmitting from the transmitter to the receiver on the at least two channels after the collision avoidance duration,
   wherein the collision avoidance duration comprises an inter-frame space and a backoff period associated with each channel.

2. The method of claim 1, comprising adjusting a physical layer mode, wherein the physical layer mode is defined by at least one of a modulation scheme and a coding scheme.

3. The method according to claim 2, wherein the channel bundling is performed before the physical layer mode is adjusted.

4. The method according to claim 1, the method further comprising:
   receiving a power control command from the communication system; and, applying the channel bundling without adjusting a transmission power of the transmitter, based on the power control command.

5. The method according to claim 1, the method further comprising:
receiving a power control command for the communication system; and,
applying the channel bundling in conjunction with a power adjustment of the transmitter, based on the power control command.

6. The method according to claim 1, wherein after the channel bundling has been applied, the transmissions start simultaneously on the at least two channels.

7. The method of claim 1, wherein transmission begins on the at least two channels after the backoff period has elapsed on a predetermined number of the at least two channels.

8. The method of claim 1, wherein each of the multiple backoff periods corresponds to a backoff parameter determined by a random number between 0 and a contention window.

9. The method of claim 1, wherein the transmission begins on each of the at least two channels independently after at least one of the multiple backoff periods has elapsed.

10. A communication device in a Carrier Sense Multiple Access with Collision Avoidance (CSMA/CA) communication system that establishes a communication channel from the communication device to a receiver by monitoring a channel for transmissions for a collision avoidance duration and only transmitting from the communication device after a channel has been idle for the collision avoidance duration, the communication device comprising:
a computer processing circuit, the computer processing circuit configured to determine an interference level at the communication device for a transmission from the communication device to a receiver,
wherein the computer processing circuit is configured to compare the determined interference level to a threshold value,
wherein the threshold value is adjusted dynamically based on a type of the transmission; and
a link adaptation processing circuit, the link adaptation processing circuit configured to:
when the determined interference level does not exceed the threshold value, transmit from the communication device to the receiver on a channel that has been idle for the collision avoidance duration, and
when the determined interference level exceeds the threshold value, perform a link adaptation,
wherein the link adaptation comprises:
identifying at least two channels that are idle for the collision avoidance duration,
applying a channel bundling by transmitting from the communication device to the receiver on the at least two channels after the collision avoidance duration,
wherein the collision avoidance duration comprises an inter-frame space and a backoff period associated with each channel.

11. The communication device of claim 10, comprising adjusting a physical layer mode, wherein the physical layer mode is defined by at least one of a modulation scheme and a coding scheme.

12. The communication device according to claim 11, wherein the channel bundling is performed before the physical layer mode is adjusted.

13. The communication device according to claim 10, wherein transmission begins on each of the at least two channels independently once at least one of the multiple backoff processes has been completed.

14. The communication device according to claim 10, wherein transmission begins on the at least two channels in parallel once a backoff process has been completed on a predetermined number of the at least two channels.

15. The communication device according to claim 10, wherein each of the multiple backoff processes corresponds with a backoff parameter determined by a random number between 0 and a contention window value.

16. A non-transitory computer-readable storage medium having executable instructions for supporting operation in a Carrier Sense Multiple Access with Collison Avoidance (CSMA/CA) communication system, wherein a communication link is established between a transmitter and a receiver by monitoring a channel for transmissions for a collision avoidance duration and only transmitting after a channel has been idle for the collision avoidance duration, when executed, the executable instructions comprising:
determining an interference level at the transmitter for a transmission from the transmitter to the receiver;
comparing the determined interference level to a threshold value, wherein the threshold value is adjusted dynamically based on a type of the transmission; and
when the determined interference level does not exceed the threshold value, transmit from the communication device to the receiver on a channel that has been idle for the collision avoidance duration, and
when the determined interference level exceeds the threshold value, performing a link adaptation,
wherein the link adaptation comprises:
identifying at least two channels that are idle for the collision avoidance duration, and
applying a channel bundling by transmitting from the transmitter to the receiver on the at least two channels after the collision avoidance duration,
wherein the collision avoidance duration comprises an inter-frame space and a backoff period associated with each channel.

17. The storage medium of claim 16, wherein the executable instructions comprise adjusting a physical layer mode, wherein the physical layer mode is defined by at least one of a modulation scheme and a coding scheme.

18. The storage medium of claim 16, wherein transmission begins on the at least two channels after the backoff period has elapsed on a predetermined number of the at least two channels.

19. The storage medium of claim 16, wherein transmission begins on each of the at least two channels independently once the backoff period of each channel has elapsed.

20. The storage medium of claim 16, wherein the executable instructions comprise:
receiving a power control command from the communication system; and,
applying the channel bundling without adjusting a transmission power of the transmitter, based on the power control command.

\* \* \* \* \*